Figure 1:
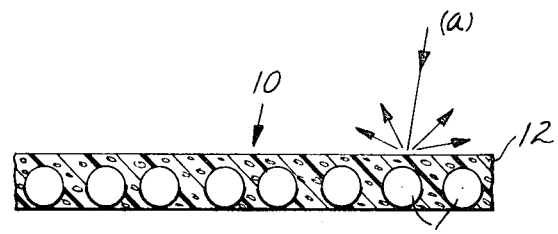

United States Patent
Courneya

[15] 3,649,352
[45] Mar. 14, 1972

[54] HEAT-SENSITIVE RETROREFLECTING MATERIALS

[72] Inventor: Calice G. Courneya, Alexandria, Minn.

[73] Assignee: Minnesota Mining and Manufacturing Company, St. Paul, Minn.

[22] Filed: July 9, 1970

[21] Appl. No.: 53,386

[52] U.S. Cl. ..........117/201, 117/35 R, 73/356, 73/358, 260/37 R, 260/41 R, 106/193 R, 106/241, 264/1
[51] Int. Cl. ..........................................B44c 1/18
[58] Field of Search..............117/35 R, 35 V, 35 S, 201, 117/212, 232, 36.7, 36.8; 260/37 R, 41 R; 106/193 R, 241, 287; 264/1; 350/105; 73/356, 358

[56] References Cited

UNITED STATES PATENTS

| | | | |
|---|---|---|---|
| 2,407,680 | 9/1946 | Palmquist et al. | 350/105 |
| 2,574,971 | 11/1951 | Heltzer | 350/105 X |
| 2,963,378 | 12/1960 | Palmguist et al. | 106/193 R |
| 2,997,403 | 8/1961 | Searight | 350/1o5 X |
| 3,187,068 | 6/1965 | De Vuer et al. | 261/1 |
| 3,441,948 | 4/1969 | Ondis | 117/36.7 X |
| 3,511,700 | 5/1970 | Miro | 117/36.7 X |

*Primary Examiner*—Alfred L. Leavitt
*Assistant Examiner*—Wm. E. Ball
*Attorney*—Kinney, Alexander, Sell, Steldt & Delahunt

[57] ABSTRACT

An article useful as a label or thermal telltale which becomes visibly retroreflective in response to simple heating, provided by retroreflective elements masked with a heat-sensitive light-obscuring layer which is removed from the retroreflective elements by heating. A liquid-coating composition is also provided for preparing the article.

8 Claims, 4 Drawing Figures

PATENTED MAR 14 1972         3,649,352

INVENTOR.
CALICE G. COURNEYA
BY Kinney, Alexander,
Sell, Steldt & DeLaHunt
ATTORNEYS

HEAT-SENSITIVE RETROREFLECTING MATERIALS

This invention relates to articles having a surface coating or layer which is capable of being rendered retroreflective by simple heating, and which are therefore useful as labels, thermal telltales, and in other ways. The invention also relates to a coating composition for making the articles. One particularly important application is in the detection, in electronic circuits, of defective components which are frequently difficulty accessible for testing. Such elements are easily provided, either before or after installation in a circuit, with an inherently retroreflective coating which is initially inconspicuous but becomes brilliantly retroreflective upon brief heating experienced during failure of the element. The defective component is then quickly and easily located by retroreflection of light rays from a test lamp.

Products of the invention may be in the form of thin sheet materials which may be used as such, e.g., in the preparation of labels, or may be applied to various articles as telltales or the like. The invention also contemplates forming the inherently retroreflective coating directly upon the surface of an article, by application of liquid-coating composition which is then dried.

Retroreflective coatings have previously been described. A well-known form employing tiny glass beads on a reflective support and covered with a transparent covering having a flat face is shown in U.S. Pat. No. 2,407,680. U.S. Pat. No. 2,574,971 describes the application of coatings containing beads in a nontransparent paint which at first obscures, but by attrition is subsequently removed from, the upper surfaces of the beads. Light-sensitive and chemically reactive coatings have been applied over retroreflective layers, e.g., as described in U.S. Pat. No. 3,222,986.

The present invention likewise may employ transparent beads as the retroreflective component, while in addition including means for obscuring or masking the retroreflective elements which means can be removed from the retroreflective elements by heating.

Glass sphericles have previously been incorporated in heat-sensitive light-diffusing masking layers, as shown for example in U.S. Pat. No. 2,668,126. The particles are not retroreflective, and may indeed be light-diffusing.

As is well known, the characteristic of certain reflectors in returning back a brilliant cone of light toward the source of an angularly incident light beam is generally designated by the term "reflex reflection." This type of reflection is to be distinguished from the reflection of mirrors which is specular reflection, and from the action of diffusing types of reflective surfaces which dissipate the incident light in all directions without selective return in the direction of incidence. A reflex-reflecting element may take the form of a transparent sphere having a forward lens surface for refracting incident light, together with a rearward reflector for returning the light through the lens surface. The retroreflecting elements are generally so small they are practically unnoticeable when viewed directly but are nevertheless capable of powerful retroreflective action when appropriately positioned with respect to an illumination source.

In the present invention the retroreflective elements are masked by an obscuring material which has an initial overall nontransparent, e.g., opaque or translucent, state that will not permit light rays to pass in a coherent pattern. The light rays impinging upon the surface of a layer of the material will either be absorbed, diffused in all directions, or otherwise reflected therefrom. The obscuring material, normally in a solid state, achieves a fluid state and will flow to physically expose a portion of the surface of the retro-reflecting elements when heated at the requisite temperature, thereby permitting light rays to be retroreflected.

Figure 2:
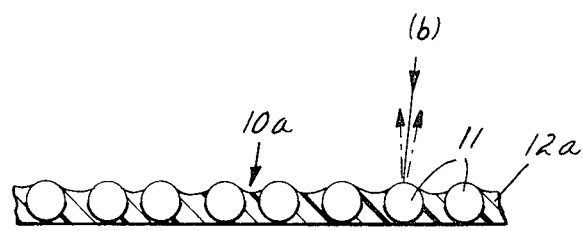
Figure 3:
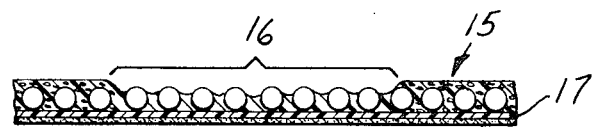
Figure 4:
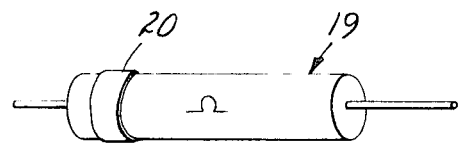

To better understand the present invention, reference is directed to the accompanying drawings wherein:

FIGS. 1 through 3, inclusive, are representations in cross section of various aspects of the present invention; and FIG. 4 is a view in perspective of an electronic component having a band thereon formed according to the present invention.

In FIG. 1, article 10 comprises a vast number of minute light retroreflective particles 11 imbedded in heat-sensitive obscuring layer 12 which is capable of preventing the passage of a coherent pattern of visible light therethrough. This light dissipation is graphically represented in FIG. 1 by light rays (a). Heating article 10 at the requisite temperature will cause the obscuring layer 12 to be converted from a normally solid state to a fluid state and to flow away from the beads by filling the voids within the blush layer thereby exposing the tops of the retroreflective particles 11, providing retroreflection of light.

Retroreflective particles 11 shown in article 10 of FIG. 1 are inherently retroreflective and heat resistant, i.e., capable of withstanding the temperatures required to convert the obscuring layer to the fluid state. Specifically useful retroreflective particles meeting these requirements are half-reflectorized transparent beads such as those disclosed in the teachings of U.S. Pat. No. 2,963,378. Vast numbers of these minute beads are randomly dispersed in obscuring layer 12 of article 10. The beads are inconspicuous until obscuring coating 12 has been subjected to the requisite heating. Once the coating has been heated to the requisite temperature the beads are still individually inconspicuous but an over-all visual effect is realized when a beam of light rays is directed toward the coating. A brilliant reflection of light is had in the heated areas of the coating, providing an observer with an enhanced visual stimulus as to the information contained on the label. After being subjected to the requisite heating, the retroreflective elements are permanently partially exposed and the article becomes retroreflective.

FIG. 2 shows the article 10a after having been subjected to the requisite temperature. The heated area is characterized by having protruding retroreflective elements 11 embedded in layer 12a derived from the obscuring layer. Retroreflection is graphically represented in FIG. 2 by light rays (b).

FIG. 3 shows an article 15 which has been partially subjected to the requisite heating. Heated area 16 is characterized by having retroreflective elements protruding therefrom, permitting retroreflection, whereas the unheated portion of the article 15 will not retroreflect light.

Various other layers may be contained in the article depending upon the particular requirements. For example, a flexible sheet material represented by layer 17 in FIG. 3 can be provided as a supporting carrier, and an adhesive layer 18 can be provided on the lower surface to facilitate attachment of an article sheet to a substrate.

One important application of the aforementioned features of the present invention is in the area of electronics. The invention finds use in detecting defective electronic components which generally show no external signs of failure occasioned by excessive loading resulting in overheating. FIG. 4 shows one such component, e.g., a resistor 19, having a band 20 thereon formed in accordance with the invention. When the resistor heats during failure the band 20 becomes retroreflective and easily conspicuous under an inspection light.

The retroreflective elements are generally no more than 0.1 inch in maximum extent and preferably no more than 0.01 inch. Specifically useful retroreflective elements are half-reflectorized glass beads which have diameters ranging from 10 to 50 microns and a refractive index of at least about 1.8, preferably about 1.9. The beads can be provided with a reflector half cap by various procedures. One way is to use a high-vacuum metal vapor deposition procedure. Aluminum and tin may be deposited in this way. Another procedure involves forming a releasable monolayer of beads on a heat-resistant carrier and plating the hemispherical upper surface by exposure to metal carbonyl gas that is reduced in situ. Nickel and chromium coatings can be applied in this way. Still other procedures involve silver-plating and spraying with various materials. Since the above-mentioned procedures are applications of well-known processes, detailed working descriptions are not deemed necessary.

The retroreflective elements are imbedded in or otherwise masked by aforementioned obscuring layer. When a light beam is directed toward a coated article made according to the teachings of the invention, no light can be retroreflected unless the obscuring layer has achieved the requisite temperature. Utilizing this capability the obscuring material prevents light rays from effectively striking the retroreflective elements, making retroreflection impossible until the obscuring layer has been rendered fluid and flows from the top portion of the retroreflective elements. At least about 10 percent of the total surface area of a bead must be exposed before adequate retroreflection is achieved.

One type of material having the above property is that categorized as blush lacquer coatings of normally transparent fusible resins. Microscopic examination of blush lacquer films reveals numerous microscopic bubbles throughout their entire structures. These very small hollow spaces give the film a light or opalescent appearance commonly called blushing. Blushing may be accomplished by well-known methods which involve the actual inclusion of water or air in the hollow spaces of the film. The preferred blush lacquer coatings of the present invention are vesicular structures characterized by interconnected hollow spaces which have no water inclusions. Specifically useful blush lacquer films may be prepared according to the teachings disclosed in U.S. Pat. No. 2,519,660.

Blush lacquer films are rendered transparent and caused to contract to a lesser thickness when heated by elimination of the minute hollow spaces throughout the heated area of the film. Hollow spaces in a blush lacquer film made of a thermoplastic fusible resin can be eliminated by heating the film to a temperature sufficient to cause the vesicular resin structure to collapse and coalesce to form a thinner clear film.

A blush lacquer coating may be prepared by dissolving a normally transparent thermoplastic fusible resin in a solvent having a vapor pressure in excess of that of water and further diluting the resin solution with water, or a water-solvent mixture. The solvent must be one which is miscible with water while the resin must be substantially insoluble in water. If enough water is added to a solution of such a resin, the resin will precipitate; therefore, less water than is required to precipitate the resin should be added. This solution is coated and allowed to dry. Additionally, blush coatings may be prepared using a mixture of two solvents with the resin, thereby producing a blush film without the use of water.

Blush lacquer films can be prepared from film-forming thermoplastic fusible linear polymer resins. Exemplary resins include ethyl cellulose, cellulose acetate-propionate, cellulose acetate-butyrate, benzyl cellulose, polymethyl methacrylate, and polystyrene.

The temperatures and times required to achieve the fluid state for blush coatings may be modified by the addition of various agents. For example, the addition of subliming solids such as naphthalene will extend the time required to achieve the fluid state at the requisite temperature. Additionally, plasticizers lower the fluidizing temperature. Primary plasticizers are preferred over secondary, mechanical or lubricant plasticizers which may soften the coating. Dioctyl phthalate will reduce the fluidizing temperature of blush ethyl cellulose. Tricresyl phosphate, diamyl phthalate, dicapryl phthalate, dibutoxyethyl phthalate, tributyl citrate, butyl phthalyl butyl glycolate, and dibutyl sebacate have all been found to reduce the fluidizing temperature of blush cellulose acetate.

Plasticizers of the type discussed may be added in variable amounts to the resin, depending upon the desired reduction in fludiizing temperature. As it can be seen, the fluidizing temperature of the particular article can be tailored to meet the needs of the user.

Other well-known imaging systems may be adapted to provide the obscuring layer of the present invention. For example, an obscuring layer may include an obscuring amount of fusible organic particles which melt and coalesce upon heating to become a thinner permanently transparent layer.

The obscuring material need only be provided in a layer having a thickness sufficient to prevent the retroreflection of light, e.g., cover the tops of retroreflective beads. The obscuring layer, however, must not be so thick as to cover the entire retroreflective elements after fluidization and the achievement of a lesser thickness. At least 10 percent of the surface area of a transparent bead must be exposed before adequate retroreflection of light will be provided.

A liquid coating composition of the present invention may be prepared by mixing a blush lacquer solution with particles which are adapted to retroreflect light such as the aforementioned half-reflectorized glass beads. For this usage the coating composition must contain enough lacquer to obscure the reflective properties of the retroflective particles when the coating has dried. The blush lacquer solution consists of a lacquer mixed according to well-known teachings such as the aforementioned U.S. Pat. No. 2,519,660, to a paintlike consistency which can be deposited in a film which dries to form a blush layer. The solution may contain from 1 to 20 percent or higher of nonvolatile lacquer components, depending upon their solubility and upon the fluid consistency desired. Upon application to base surfaces, the tiny glass beads in the coating composition will spread out to form at least a monolayer containing tens of thousands of beads per square centimeter. The dried blush lacquer coating will be of just sufficient thickness to obscure the layer of beads.

The coating compositions of the present invention can be utilized in an aerosol "bomb" or "spray-can"-type applicator from which the composition can be sprayed on any desired surface. The pressure is provided by a volatile propellent liquid having a high vapor pressure that is included in the vessel. Additionally, the coating composition can be applied with conventional hand or internally powered spraying equipment. In this manner, the coating composition can be readily applied to mounted resistors, electronic circuit boxes, and similar devices.

In the following illustrative examples all parts and percentages are by weight unless otherwise stated.

EXAMPLE 1

A liquid-coating composition was prepared by mixing a blush lacquer solution with a large number of tiny half-reflectorized glass beads as follows: The blush lacquer solution was prepared by dissolving 18 parts by weight of polystyrene resin in 66 parts by weight dichloromethane and mixing the solution with 18 parts by weight of ethyl alcohol. The glass beads, having a refractive index of at least 1.8 and diameters in the range of 10—50 microns, had been previously reflectorized by vapor deposition of aluminum over one hemisphere. A volume of glass beads approximately equal to 8 percent of the volume of the blush lacquer solution as prepared above was dispersed therein. This composition was coated on a releasable surface and allowed to dry under blushing conditions to give a self-supporting blush film. The blush film, which had no initial retroreflective properties, became permanently transparent upon heating at a temperature of 105° C. and thereafter gave a brilliant retroreflective response to a light beam directed toward its surface.

EXAMPLE 2

A blush lacquer solution was prepared by dissolving 20 parts by weight low-viscosity ethyl cellulose in 20 parts by weight acetone and mixing the solution with 60 parts by weight distilled water. A volume of glass beads (as described in Example 1) equal to 50 percent of the volume of the blush lacquer solution was dispersed into the mixture. This composition was cast into a film which was found to transparentize and become retroreflective after heating at 120° C.

EXAMPLE 3

A 10 weight percent solution of hexachloroethane in acetone was substituted for the acetone in a formulation otherwise similar to Example 2 to prepare an initially non-retroreflective film which upon being heated at 125° C. for 12 minutes acquired retroreflective properties.

EXAMPLE 4

12.5 parts by weight polyethylene terephthalate resin, 12.5 parts by weight distilled water and 75 parts by weight trifluoroacetic acid was combined and stirred to produce a blush lacquer solution. A volume of glass beads (as described in Example 1) equal to about 20 percent of the volume of the solution was dispersed therein. The composition, when coated and allowed to dry, produced a film which became transparent and retroreflective at 220° C.

EXAMPLE 5

A coating composition prepared according to Example 4 was applied as a paint to deposit a band around each of a number of resistors in an electrical circuit contained within a box. A typical example is shown in FIG. 4. After the paint had dried, a light beam directed into the box revealed no retroreflective response from the marked resistors. Excess current was allowed to pass through some of the marked resistors, intentionally causing them to overheat. The marked overheated resistors gave a brilliant response of retroreflected light to a light beam directed into the box, making it a very simple matter to isolate those resistors which had overheated. No retroreflective response was seen in the marked resistors which were not subjected to excess current.

What is claimed is:

1. A liquid coating composition comprising a mixture of blush fusible-lacquer solution and particles adapted to retroreflect light, of a consistency adapted for application to a base surface to provide a thin uniform coating thereon consisting of a dried heat-sensitive blush fusible lacquer layer obscuring an imbedded layer of said particles, said coating becoming visibly retroreflecting upon simple heating.

2. The coating composition of claim 1 wherein said particles are tiny transparent spheres having an integral specularly reflective metal coating on one hemisphere.

3. The coating composition of claim 2 including a volatile propellent liquid.

4. An article having a surface which becomes retroreflective upon heating and comprising particles adapted to retroreflect light imbedded within a solid fusible obscuring layer which achieves a fluid state during heating to permit said fluid to be displaced physically exposing at least a portion of the surfaces of said beads.

5. The article of claim 4 wherein said retroreflective particles include heat-resistant transparent beads.

6. The article of claim 4 wherein said heat-sensitive obscuring layer consists of blush lacquer.

7. The article of claim 4 further comprising a substrate having attached to one surface thereof said retroreflective particles.

8. The article of claim 7 wherein the substrate is an electrical circuit component.

\* \* \* \* \*